US012573613B2

(12) United States Patent
Chen et al.

(10) Patent No.: US 12,573,613 B2
(45) Date of Patent: Mar. 10, 2026

(54) POSITIVE ELECTRODE MATERIAL, POSITIVE ELECTRODE PLATE AND BATTERY

(71) Applicant: BYD COMPANY LIMITED, Guangdong (CN)

(72) Inventors: Na Chen, Shenzhen (CN); Minghao Zhuang, Shenzhen (CN); Rong Hao, Shenzhen (CN); Yi Pan, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 547 days.

(21) Appl. No.: 18/121,909

(22) Filed: Mar. 15, 2023

(65) Prior Publication Data

US 2023/0238513 A1 Jul. 27, 2023

Related U.S. Application Data

(63) Continuation of application No. PCT/CN2021/119310, filed on Sep. 18, 2021.

(30) Foreign Application Priority Data

Sep. 18, 2020 (CN) .......................... 202010987080.X

(51) Int. Cl.
| | |
|---|---|
| C01B 25/45 | (2006.01) |
| H01M 4/131 | (2010.01) |
| H01M 4/36 | (2006.01) |
| H01M 4/505 | (2010.01) |
| H01M 4/525 | (2010.01) |
| H01M 4/02 | (2006.01) |

(52) U.S. Cl.
CPC ............. *H01M 4/364* (2013.01); *C01B 25/45* (2013.01); *H01M 4/131* (2013.01); *H01M 4/505* (2013.01); *H01M 4/525* (2013.01); *C01P 2004/61* (2013.01); *C01P 2006/10* (2013.01); *C01P 2006/40* (2013.01); *H01M 2004/021* (2013.01); *H01M 2004/028* (2013.01)

(58) Field of Classification Search
CPC . C01B 25/45; H01M 10/052; H01M 10/0525; H01M 2004/021; H01M 2004/028
USPC ......................................... 429/221
See application file for complete search history.

(56) References Cited

U.S. PATENT DOCUMENTS

| | | | | |
|---|---|---|---|---|
| 2012/0237822 A1* | 9/2012 | Futamura | .......... | H01M 10/0525 977/773 |
| 2013/0146806 A1 | 6/2013 | Chiu et al. | | |
| 2014/0138591 A1* | 5/2014 | Yoon | ..................... | H01M 4/525 429/221 |
| 2017/0170479 A1 | 6/2017 | Yazami et al. | | |
| 2019/0020015 A1 | 1/2019 | Huang et al. | | |

FOREIGN PATENT DOCUMENTS

| | | |
|---|---|---|
| CN | 103811744 A | 5/2014 |
| CN | 104577119 A | 4/2015 |
| CN | 104733709 A | 6/2015 |
| CN | 104781966 A | 7/2015 |
| CN | 106099059 A | 11/2016 |
| CN | 108206281 A | 6/2018 |
| CN | 109250698 A | 1/2019 |
| CN | 109524642 A | 3/2019 |
| CN | 109665508 A | 4/2019 |
| CN | 109962221 A | 7/2019 |
| CN | 111384372 A | 7/2020 |
| JP | 2004525059 A | 8/2004 |
| JP | 2012212663 A | 11/2012 |
| JP | 2013232313 A | 11/2013 |
| JP | 2016530684 A | 9/2016 |
| WO | 2014/034775 A1 | 3/2014 |
| WO | 2016088193 A1 | 6/2016 |

OTHER PUBLICATIONS

International Search Report and Written Opinion for Application No. PCT/CN2021/119310, mailed on Dec. 16, 2021, 9 pages.
Whitepaper "A basic guide to particle characterization", Malvern Instruments Worldwide, XP93118075A, 2015, 24 pages.

* cited by examiner

*Primary Examiner* — James M Erwin
*Assistant Examiner* — Gilberto Ramos Rivera
(74) *Attorney, Agent, or Firm* — Sheppard Mullin Richter & Hampton LLP

(57) ABSTRACT
A positive electrode material includes a first lithium manganese iron phosphate material in an aggregate form, a second and third lithium manganese iron phosphate materials in an aggregate and/or single-crystal-like form, and a fourth and fifth lithium manganese iron phosphate materials in a single-crystal-like form. $D_{50}^5 < D_{50}^4 < D_{50}^3 < D_{50}^2 < D_{50}^1$, $D_{50}^2 = aD_{50}^1$, $D_{50}^3 = bD_{50}^1$, $D_{50}^4 = cD_{50}^1$, $D_{50}^5 = dD_{50}^1$, and 5 $\mu m \leq D_{50}^1 \leq 15$ $\mu m$. $0.35 \leq a \leq 0.5$, $0.2 \leq b \leq 0.27$, $0.17 \leq c \leq 0.18$, and $0.15 \leq d \leq 0.16$. Molar ratios of manganese to iron in the first, the second, the third and the fourth lithium manganese iron phosphate materials increase sequentially, and a molar ratio of manganese to iron in the fifth lithium manganese iron phosphate material is greater than that in the third lithium manganese iron phosphate material.

20 Claims, No Drawings

POSITIVE ELECTRODE MATERIAL, POSITIVE ELECTRODE PLATE AND BATTERY

CROSS-REFERENCE TO RELATED APPLICATION

This application is a Continuation application of International Patent Application No. PCT/CN2021/119310, filed on Sep. 18, 2021, which is based on and claims priority to and benefits of Chinese Patent Application No. 202010987080.X, filed on Sep. 18, 2020. The entire content of all of the above-referenced application is incorporated herein by reference.

FIELD

The present disclosure relates to the technical field of batteries, and specifically to a positive electrode material, a positive electrode plate/sheet and a battery.

BACKGROUND

A positive electrode material is very important to the performance of a lithium-ion battery. Positive electrode materials commonly used in power batteries include ternary materials, lithium iron phosphate materials and lithium manganese iron phosphate materials. Lithium manganese iron phosphate (LMFP) has higher safety and cycle performance than ternary materials, has a much higher potential than that of lithium iron phosphate (where the potential of lithium iron phosphate is 3.4 V), and can increase the energy density of batteries. Therefore, lithium manganese iron phosphate materials with higher safety and a higher energy density have gradually become the mainstream positive electrode materials for power batteries.

At present, there are two common product forms of LMFP in the market: single-crystal-like and aggregate. A single-crystal-like material is composed of one or a few (no more than five) primary particles with very few internal grain boundaries. An aggregate material is a secondary particle material formed by agglomeration of many primary particles, with many internal grain boundaries. The primary particles of single-crystal-like LMFP materials are large, so the manganese dissolution degree of such materials is low during the battery cycle, but the capacity reached is lower under the same metal ratio. The primary particles of the aggregate are small and have a large specific surface area, so such materials can achieve a high capacity. However, the aggregate is easily crushed during compression, and the fresh surface of such materials is exposed to the electrolyte solution. As a result, serious manganese dissolution occurs in the battery cycle, degrading the cycle performance. In addition, the Mn/Fe molar ratio in LMFP materials is also an important factor affecting the structural stability of the LMFP materials as well as the cycle stability and rate performance of the battery. Therefore, it is necessary to provide a novel positive electrode material including LMFP, which can be used to prepare a battery having good performance such as a high capacity, low dissolved manganese content and high cycle stability.

SUMMARY

The present disclosure provides a positive electrode material, a positive electrode plate and a battery. By configuring the particle sizes, morphologies and Mn/Fe molar ratios of multiple LMFP materials with different particle sizes in the positive electrode material, a positive electrode plate having an appropriate compaction density manufactured with the positive electrode material can optimize the electrochemical properties of the battery.

According to a first aspect, the present disclosure provides a positive electrode material, including: a first lithium manganese iron phosphate material, a second lithium manganese iron phosphate material, a third lithium manganese iron phosphate material, a fourth lithium manganese iron phosphate material and a fifth lithium manganese iron phosphate material, wherein, the first lithium manganese iron phosphate material is an aggregate, the fourth lithium manganese iron phosphate material and the fifth lithium manganese iron phosphate material are single-crystal-like, the second lithium manganese iron phosphate material and the third lithium manganese iron phosphate material are aggregates and/or single-crystal-like, and particle size relationships thereof satisfy:

$$D_{50}^5 < D_{50}^4 < D_{50}^3 < D_{50}^2 < D_{50}^1, \ D_{50}^2 = aD_{50}^1, \ D_{50}^3 = bD_{50}^1,$$
$$D_{50}^4 = cD_{50}^1, \ D_{50}^5 = dD_{50}^1, \text{ and } 5 \ \mu m \leq D_{50}^1 \leq 15 \ \mu m,$$

wherein, $D_{50}^1$ to $D_{50}^5$ represent particle sizes $D_{50}$ of the first lithium manganese iron phosphate material to the fifth lithium manganese iron phosphate material, a is in a range of 0.35 to 0.5 inclusive, b is in a range of 0.2 to 0.27 inclusive, c is in a range of 0.17 to 0.18 inclusive, and d is in a range of 0.15 to 0.16 inclusive; and molar ratios of manganese to iron in the first lithium manganese iron phosphate material, the second lithium manganese iron phosphate material, the third lithium manganese iron phosphate material, and the fourth lithium manganese iron phosphate material increase sequentially, and a molar ratio of manganese to iron in the fifth lithium manganese iron phosphate material is greater than that in the third lithium manganese iron phosphate material.

According to a second aspect, the present disclosure provides a positive electrode slurry including the positive electrode material described in the first aspect of the present disclosure, a conductive agent and a solvent.

According to a third aspect, the present disclosure provides a positive electrode plate, including a current collector and a positive electrode material layer disposed on the current collector, where the positive electrode material layer includes the positive electrode material described in the first aspect of the present disclosure, or is obtained by coating the positive electrode slurry described in the second aspect of the present disclosure on the current collector.

According to a fourth aspect, the present disclosure provides a battery, including the positive electrode plate according to the third aspect of the present disclosure.

The present disclosure has the following beneficial effects. When the five lithium manganese iron phosphate materials included in the positive electrode material provided by the present disclosure meet the requirements of the $D_{50}$ particle size relationship, the morphology requirements and the Mn/Fe molar ratio, the positive electrode plate manufactured with the positive electrode material has high compaction density, and the battery having the positive electrode plate has excellent electrical properties such as high capacity, voltage plateau and cycle stability, and low dissolved manganese content.

Additional aspects and advantages of the present disclosure will be partly given in and partly apparent from the description below, or understood through practice of the present disclosure.

DETAILED DESCRIPTION

While example embodiments of the present disclosure have been described above, the present disclosure is not limited thereto. It should be appreciated that some improvements and modifications can be made by those skilled in the art without departing from the technical principles of the present disclosure, which are also contemplated to be within the scope of the present disclosure.

According to an aspect of the present disclosure, an embodiment of the present disclosure provides a positive electrode material, including a first lithium manganese iron phosphate material, a second lithium manganese iron phosphate material, a third lithium manganese iron phosphate material, a fourth lithium manganese iron phosphate material, and a fifth lithium manganese iron phosphate material. The first lithium manganese iron phosphate material is an aggregate, the fourth lithium manganese iron phosphate material and the fifth lithium manganese iron phosphate material are single-crystal-like, the second lithium manganese iron phosphate material and the third lithium manganese iron phosphate material are aggregates and/or single-crystal-like, and following particle size relationships are satisfied:

$D_{50}^5 < D_{50}^4 < D_{50}^3 < D_{50}^2 < D_{50}^1$, $D_{50}^2 = aD_{50}^1$, $D_{50}^3 = bD_{50}^1$, $D_{50}^4 = cD_{50}^1$, $D_{50}^5 = dD_{50}^1$, and $5\ \mu m \le D_{50}^1 \le 15\ \mu m$, where, $D_{50}^1$ to $D_{50}^5$ represent values of particle sizes $D_{50}$ of the first lithium manganese iron phosphate material to the fifth lithium manganese iron phosphate material, a value range of a is 0.35 to 0.5, a value range of b is 0.2 to 0.27, a value range of c is 0.17 to 0.18, and a value range of d is 0.15 to 0.16. The above ranges and any other ranges disclosed in this application include the boundary values unless explicitly disclaimed.

Molar ratios of manganese to iron in the first lithium manganese iron phosphate material, the second lithium manganese iron phosphate material, the third lithium manganese iron phosphate material, and the fourth lithium manganese iron phosphate material increase sequentially, and the molar ratio of manganese to iron in the fifth lithium manganese iron phosphate material is greater than that in the third lithium manganese iron phosphate material.

In the present disclosure, the above $D_{50}^1$ to $D_{50}^5$ can be regarded as particle sizes of secondary particles (if an LMFP single-crystal-like material is composed of one primary particle, it can also be regarded as a "secondary particle"). LMFP materials with different morphology, different particle size $D_{50}$ values and different Mn/Fe molar ratios affect the rate performance, cycle stability and dissolved Mn content of the battery. The first lithium manganese iron phosphate material in the aggregate form has many grain boundaries, indicating a large energy barrier for diffusion of lithium ions therein. However, the particle size of primary particles of the material is small, indicating a short path for diffusion of lithium ions. The first lithium manganese iron phosphate material has the smallest Mn/Fe molar ratio and a good rate performance, and can also reduce the high degree of Mn dissolution caused by the large specific surface area of the material. The fourth and fifth lithium manganese iron phosphate materials in the single-crystal-like form have fewer grain boundaries and a small diffusion energy barrier. However, the particle size of primary particles of the fourth and fifth lithium manganese iron phosphate materials is large, indicating a long path for diffusion of lithium ions. The fourth and fifth lithium manganese iron phosphate materials have a large Mn/Fe molar ratio, and can further improve the performance such as a voltage plateau and energy density of the battery while maintaining a high structural stability. Therefore, under the joint action of the above-mentioned morphology requirements, $D_{50}$ particle size requirements and Mn/Fe molar ratios, the above-mentioned five lithium manganese iron phosphate materials have basically consistent charge and discharge capabilities, and have relatively stable structures. The battery manufactured with the above-mentioned positive electrode material can have excellent properties such as a good rate performance, high capacity, high discharge plateau, high cycle stability and low dissolved manganese content.

In addition, under the $D_{50}$ particle size requirements of the above five LMFP materials, the positive electrode plate/sheet manufactured with the above positive electrode material can also have good compaction density. If the values of a, b, c and d are not in the above ranges, the particle sizes of the five lithium manganese iron phosphate materials cannot be well distinguished from each other, and the compaction density of the electrode plate manufactured with these materials cannot be increased by multiple filling of LMFP materials with different particle size levels.

According to an embodiment of the present disclosure, the value range of a is $0.41 \le a \le 0.45$, and the value range of b is $0.21 \le b \le 0.23$. According to another embodiment of the present disclosure, a is 0.41, b is 0.23, c is 0.18, and d is 0.16.

In the present disclosure, if the $D_{50}^1$ of the first lithium manganese iron phosphate material is too small, the compaction density of the positive electrode plate may still be low even when the above particles with different sizes are used in combination. In addition, if the $D_{50}^1$ of the first lithium manganese iron phosphate material is too small, the particle size of the primary particle is lower, and the specific surface area of the first lithium manganese iron phosphate material increases, increasing the side reactions between the first lithium manganese iron phosphate material and the electrolyte solution, affecting the structural stability of the first lithium manganese iron phosphate material during the cycle process, and resulting in an increased dissolved Mn content. If the $D_{50}^1$ of the first lithium manganese iron phosphate material is too large, the compaction density of the positive electrode plate is decreased to a certain extent. In addition, according to the relationship between the particle sizes of the particles, the particle sizes of the fourth and fifth lithium manganese iron phosphate materials in the single-crystal-like form are also very large, which leads to a longer path for the diffusion of lithium ions in these two materials, resulting in degraded rate performance of the battery.

It should be noted that, "the second lithium manganese iron phosphate material and the third lithium manganese iron phosphate material are aggregates and/or single-crystal-like respectively" can be understood as that the second lithium manganese iron phosphate material is in the aggregate or single-crystal-like or contains both aggregate and single-crystal-like materials, and similarly, the third lithium manganese iron phosphate material is in the aggregate or single-crystal-like or contains both aggregate and single-crystal-like materials.

In the present disclosure, the Mn/Fe molar ratios in the first lithium manganese iron phosphate material, the second lithium manganese iron phosphate material, the third lithium manganese iron phosphate material and the fourth lithium manganese iron phosphate material increase in sequence. The Mn/Fe molar ratios in the fourth and fifth lithium manganese iron phosphate materials are greater than the Mn/Fe molar ratio in the third lithium manganese iron phosphate material in sequence. The Mn/Fe molar ratio in the third lithium manganese iron phosphate material is greater than the Mn/Fe molar ratio in the second lithium manganese iron phosphate material. The Mn/Fe molar ratio in the second lithium manganese iron phosphate material is greater than the Mn/Fe molar ratio in the first lithium manganese iron phosphate material. The Mn/Fe molar ratio in the fifth lithium manganese iron phosphate material may be equal to or not equal to the Mn/Fe molar ratio in the fourth lithium manganese iron phosphate material.

According to an embodiment of the present disclosure, the Mn/Fe molar ratio in the first lithium manganese iron phosphate material is 1-1.25. The Mn/Fe molar ratio in the second lithium manganese iron phosphate material is 1.5-2.33. The Mn/Fe molar ratio in the third lithium manganese iron phosphate material is 2.33-4. The Mn/Fe molar ratios in the fourth and fifth lithium manganese iron phosphate materials are 4-9 respectively. When the Mn/Fe molar ratios in the five LMFP materials are in these ranges, the five lithium manganese iron phosphate materials can have more consistent charge and discharge capabilities and higher structural stability.

According to an embodiment of the present disclosure, in the positive electrode material, a median particle size of primary particles of the aggregate is in a range of 100 nm to 500 nm. That is, a median particle size of the primary particles of the first lithium manganese iron phosphate material is in the range of 100 nm to 500 nm, a median particle size of the primary particles of the second lithium manganese iron phosphate material in the aggregate form is in the range of 100 nm to 500 nm, and a median particle size of the primary particles of the third lithium manganese iron phosphate material in the aggregate form is in the range of 100 nm to 500 nm.

With the design of the same particle size of secondary particles, the aggregates of which the median particle sizes are in the above range can avoid the increase of specific surface area of secondary particles caused by the increase of the number of primary particles constituting secondary particles of the LMFP material, thereby avoiding the increase of area where side reactions occur. Meanwhile, in the compression process of the positive electrode plate, the breakage rate of secondary particles can be reduced, thereby avoiding the problem of formation of new interfaces to degrade the battery performance. In addition, the aggregates of which the median particle sizes are in the above range can shorten the diffusion path of lithium ions in the secondary particle materials, thereby avoiding the problems of low capacity of LMFP materials as well as increased impedance and reduced power performance of the battery. Also, the aggregates of which the median particle sizes are in the above range can prevent the primary particles of the aggregates from being too small to increase side reactions between the aggregates and the electrolyte solution, thereby avoiding the deterioration of the structural stability of the aggregates and the increase of the dissolved Mn content. In addition, the diffusion path of lithium ions in the aggregates is more appropriate, achieving good rate performance of the battery.

According to an embodiment of the present disclosure, the particle size of the single-crystal-like primary particle is in a range of 0.5 μm to 2.5 μm. This can prevent the single-crystal-like primary particle from being too large to lengthen the diffusion path of lithium ions and degrade the rate performance of the battery. According to an embodiment of the present disclosure, the particle size of the primary particles of the fourth lithium manganese iron phosphate material and the fifth lithium manganese iron phosphate material can both be in a range of 1.5 μm to 2.5 μm, the median particle size of the primary particles of the third lithium manganese iron phosphate material in the single-crystal-like form is in a range of 1.0 μm to 1.5 μm, and the median particle size of the primary particles of the second lithium manganese iron phosphate material in the single-crystal-like form is in a range of 0.5 μm to 1.0 μm. In this way, the five lithium manganese iron phosphate materials can have more consistent charge and discharge capabilities.

In the present disclosure, a particle quantity ratio between the first lithium manganese iron phosphate material, the second lithium manganese iron phosphate material, the third lithium manganese iron phosphate material, the fourth lithium manganese iron phosphate material and the fifth lithium manganese iron phosphate material may be (0.8-1.2):(0.8-1.2):(1.6-2.4):(6.4-9.6):(6.4-9.6). When the particle quantity ratio of the above five lithium manganese iron phosphate materials is in the above ranges, the positive electrode plate manufactured with the above positive electrode material can have a higher compaction density (2.55 g/cm$^3$ or more). According to an embodiment of the present disclosure, the particle quantity ratio between the first lithium manganese iron phosphate material, the second lithium manganese iron phosphate material, the third lithium manganese iron phosphate material, the fourth lithium manganese iron phosphate material and the fifth lithium manganese iron phosphate material is 1:1:2:8:8. In this way, the positive electrode plate can have an extremely high compaction density (e.g., about 2.9 g/cm$^3$). Further, a particle mass ratio between the first lithium manganese iron phosphate material, the second lithium manganese iron phosphate material, the third lithium manganese iron phosphate material, the fourth lithium manganese iron phosphate material and the fifth lithium manganese iron phosphate material may be 100:14:2.5:0.5:0.3.

According to an embodiment of the present disclosure, the surfaces of the first to fifth lithium manganese iron phosphate materials may further be provided with a carbon cladding layer, so as to improve the electrical conductivity of the lithium manganese iron phosphate materials.

The LMFP material in the aggregate form can be prepared by the following method:

(1) Raw materials (manganese source, iron source, phosphorus source, lithium source, and carbon source) for synthesizing LMFP are mixed according to a certain mass ratio, and the mixed materials are wet ground with water to a particle size of 40 nm-60 nm.

(2) The ground wet material is spray dried to obtain a dry powder.

(3) The dry powder is sintered in an atmosphere with an oxygen concentration less than 150 ppm. The sintering process includes a first heating stage, a first constant temperature stage, a second heating stage, a second constant temperature stage, and a cooling stage in sequence. In the first heating stage, the temperature is raised from the room temperature to a first constant temperature (e.g., 400° C.), where the heating time can be 2.5 h to 3.5 h. The holding time of the first constant temperature is 3.5 h to 5.5 h. In the second heating stage, the temperature is raised from the first constant temperature (e.g., 400° C.) to a second constant temperature (e.g., 700° C.), where the heating time can be 2.5 h to 4.0 h. The holding time of the second constant temperature can be 2.5 h to 4.5 h. In the cooling stage, the temperature is lowed from the second constant temperature (such as 700° C.) to about 50° C., where the cooling time is 5.5 h to 7.5 h.

(4) The sintered material is crushed by airflow. The pressure of airflow crushing can be 3 MPa to 5 MPa, and the time of airflow crushing can be 2 h to 3 h. Then, screening and grading are carried out to obtain a material with a required particle size $D_{50}$.

According to an embodiment of the present disclosure, in the step (1), the mixing time may be 0.5 h to 1.5 h. According to another embodiment of the present disclosure, the mixing time in the step (1) may be 0.75 h to 1.2 h.

According to an embodiment of the present disclosure, in the step (1), manganese iron phosphate can be used as the manganese source, iron source and phosphorus source at the same time. The lithium source may include, but is not limited to, at least one of lithium hydroxide, lithium carbonate, lithium nitrate, lithium oxalate, lithium dihydrogen phosphate, lithium citrate, and lithium acetate. The carbon source includes, but is not limited to, at least one of glucose, sucrose, starch, fructose, citric acid, ascorbic acid, and polyethylene glycol.

According to an embodiment of the present disclosure, in the step (1), the material may be ground using a grinding medium with a diameter of 0.6 mm to 0.8 mm to a particle size of 50 μm or below, and then ground using a grinding medium with a diameter of 0.1 mm to 0.3 mm to a particle size of 40 nm to 60 nm.

According to an embodiment of the present disclosure, in the step (2), the inlet temperature during the spray drying may be 150° C. to 200° C. According to another embodiment of the present disclosure, the inlet temperature during the spray drying is 160° C. to 180° C.

The preparation methods of the LMFP materials in the single-crystal-like form are different from those of the LMFP materials in the aggregate form in the first constant temperature and the second constant temperature during sintering and the pressure during airflow crushing.

For the preparation of the LMFP material in the single-crystal-like form, in the sintering process, in the first heating stage, the temperature is raised from the room temperature to a first constant temperature (e.g., 450° C.), where the heating time can be 2.5 h to 3.5 h. The holding time of the first constant temperature is 3.5 h to 5.5 h. In the second heating stage, the temperature is raised from the first constant temperature (e.g., 450° C.) to a second constant temperature (e.g., 750° C.), where the heating time can be 2.5 h to 4.0 h. The holding time of the second constant temperature can be 2.5 h to 4.5 h. In the cooling stage, the temperature is lowed from the second constant temperature (such as 750° C.) to about 50° C., where the cooling time is 5.5 h to 8.6 h. In addition, for the preparation of the LMFP material in the single crystal-like form, after the sintering, the airflow crushing can be carried out at a pressure of 5 MPa to 8 MPa for 2 h to 3 h. Then, screening and grading are carried out to obtain a material with the required particle size.

An embodiment of the present disclosure further provides a positive electrode slurry, including the positive electrode material. The positive electrode slurry further includes a conductive agent, a binder and a solvent.

According to a second aspect of the present disclosure, a mass ratio of the positive electrode material, the conductive agent and the binder is 100:(0.5-5):(0.5-5). According to another embodiment of the present disclosure, the solid content in the positive electrode slurry is 10 wt % to 80 wt %.

The conductive agent includes at least one of carbon nanotubes, carbon black and graphene. According to another embodiment of the present disclosure, the conductive agent includes carbon nanotubes, carbon black and graphene. The conductive agent of three dimensions can make the positive electrode material layer formed by the positive electrode slurry have good electrical conductivity. Further, a mass ratio of carbon nanotubes, carbon black and graphene can be 6:5:2.

The binder is a conventional choice in the battery field and may be, for example, selected from one or more of polyvinylidene fluoride (PVDF), polytetrafluoroethylene (PTFE), polyvinyl alcohol (PVA), styrene-butadiene rubber (SBR), polyacrylonitrile (PAN), polyimide (PI), polyacrylic acid (PAA), polyacrylate, polyolefin, sodium carboxymethyl cellulose (CMC) and sodium alginate. The PVDF can refer to a copolymer obtained by copolymerizing vinylidene fluoride with an olefin compound containing a polar group. The polar group includes at least one of carboxyl group, epoxy group, hydroxyl group and sulfonic acid group. The existence of the polar group can enhance the peel strength between the positive electrode material layer formed by the positive electrode slurry and the current collector.

The solvent is a conventional choice in the battery field, and is, for example, N-methylpyrrolidone (NMP).

According to an embodiment of the present disclosure, the positive electrode slurry can further contain a dispersant to better improve the dispersibility and stability of the positive electrode slurry. The dispersant can be polyvinylpyrrolidone (PVP), etc.

During the preparation of the positive electrode slurry, the first LMFP material, the second LMFP material and the third LMFP material with a larger particle size can be directly added in the form of powder, so as to prevent sedimentation during slurry mixing. The fourth LMFP material and the fifth LMFP material with a smaller particle size can be added in the form of powder or slurry. Each slurry includes an organic solvent, and may further includes a dispersant, such as PVP.

According to a third aspect of the present disclosure, an embodiment of the present disclosure further provides a positive electrode plate, including a current collector and a positive electrode material layer arranged on the current collector, where the positive electrode material layer includes the positive electrode material described in the first aspect of the present disclosure, or is obtained by coating the positive electrode slurry on the current collector. Therefore, the positive electrode plate including the positive electrode material has a high compaction density.

The positive electrode material layer further includes a conductive agent and a binder. The positive electrode material layer can be formed by coating the positive electrode slurry on the current collector.

According to a fourth aspect of the present disclosure, an embodiment of the present disclosure further provides a battery, including the positive electrode plate. The battery has excellent electrical properties such as high capacity, low probability of manganese dissolution and high cycle stability.

The embodiments of the present disclosure are further described below with reference to a number of embodiments.

Preparation of Positive Electrode Material

The first LMFP material to the fifth LMFP material meeting the above morphology requirements were respectively recorded as particle 1, particle 2, particle 3, particle 4 and particle 5. Five types of particles were respectively selected according to the particle size, quantity and Mn/Fe molar ratio in Table 1 for subsequent mixing to obtain positive electrode materials corresponding to different examples.

Methods for testing items of each LMFP material were as follows.

A method for testing the particle size of each LMFP material was as follows. A laser particle size analyzer Malvern 2000/3000 was used as the test equipment. The LMFP materials were dispersed in deionized water for 10 min, where the refractive index of particles was 1.74. The particle size $D_{50}$ of each LMFP material was obtained by testing.

A method for testing the particle quantities of LMFP materials with different particle sizes was as follows. LMFP materials with different particle sizes were approximately spherical. The mass of a single sphere was calculated according to the particle size $D_{50}$ and a bulk density (about 3.6 g/cm³) of each particle. The particle quantities of the LMFP materials with different particle sizes were controlled by controlling the feeding mass of the LMFP materials with different particle sizes.

A method for testing the median particle size (particle size $D_{50}$) of primary particles of each LMFP material was as follows. Scanning electron microscope (SEM) images of the LMFP materials at magnification of 10000 times were taken. The sizes of about 300 primary particles were measured manually, and a quantity distribution was made to obtain the median particle size of primary particles.

Mn/Fe molar ratio of each LMFP material: 0.2000 g of particles of each LMFP material was weighed, to which analytically pure commercial hydrochloric acid and nitric acid were added for heating digestion (where the digestion solution was formulated by taking 1 mL of a mixture of commercial concentrated hydrochloric acid and water at a volume ratio of 1:1, and then mixing the mixture with 3 mL of commercial concentrated nitric acid). Then, the solution was filtered by a filter paper, and the filter paper was washed with deionized water for at least three times to ensure that ions have fully entered the filtrate. Then, the volume was adjusted to 100 mL. The concentrations of Fe and Mn ions were measured according to GB/T 9723-2007 Chemical reagent—General rules for flame atomic absorption spectrometry (AAS). The Mn/Fe molar ratio was calculated.

Preparation of Positive Electrode Slurry

An organic solvent NMP and a binder PVDF were added at a certain ratio into a mixer. After stirring for 1 h, a conductive agent (which is a mixture of carbon tubes, carbon black and graphene at a mass ratio of 0.6:0.5:0.3) was added into the mixer. The mixture was stirred for 30 min, and then the particles 1, 2 and 3 were added in the form of powders. After stirring for 1.5 h, PVP-containing NMP slurries of the particles 4 and 5 were added. The mixture was stirred for 1.5 h, and sieved to obtain a positive electrode slurry. In the positive electrode slurry, the mass ratio of the positive electrode material composed of the particles 1 to 5, the conductive agent, the binder PVDF and the organic solvent NMP was 100:2:2:30.

Preparation of Positive Electrode Plate

Each of the positive electrode slurries corresponding to the examples was coated on two side surfaces of an aluminum foil. After drying, a positive electrode material layer is formed on the aluminum foil to obtain an uncompressed positive electrode plate. The uncompressed positive electrode plate is made into a size of 40*100 mm, and then compressed by a large hydraulic press to obtain a compressed positive electrode plate. The compaction density of the positive electrode plate can be calculated according to the areal density of the positive electrode plate and the thickness after compression. The results are shown in Table 2.

Preparation of Battery

First, the positive electrode slurry corresponding to each example was prepared into a single-sided positive electrode plate with an areal density of 2.0 g/dm² and a compaction density of 2.65 g/cm³. Each single-sided positive electrode plate is manufactured into a 2025 button cell.

First, the positive electrode slurry corresponding to each example was prepared into a double-sided positive electrode plate with an areal density of 4.0 g/dm² and a compaction density of 2.65 g/cm³. Then a double-sided negative electrode plate with an areal density of 2.1 g/dm² and a compaction density of 1.60 g/cm³ was provided. APP film is used as a separator to assemble a 053450 whole cell.

The specific capacity of each button cell was tested. The median voltage, the rate performance and the amount of Mn dissolved in the negative electrode during the cycle of each whole cell were tested. The results are shown in Table 2.

A method for testing the specific capacity was as follows. The button cell corresponding to each example was charged to a voltage of 4.3 V at a 0.1 C constant current and constant voltage (CC-CV), where the cut-off current was 0.05 C. Then discharged to 2.5 V at a 0.1 C constant current and current voltage. The charge and discharge cycles were carried out for three times. The specific capacity of the battery was calculated by dividing the discharge capacity after the third cycle by the dressing amount of the positive electrode material layer on the positive electrode plate.

The median voltage refers to a discharge voltage corresponding to half of the discharge capacity in the ⅓ C discharge curve of the battery. A method for testing a median value voltage is: the whole cell corresponding to each example was charged to a voltage of 4.3 V at a ⅓ C constant current and constant voltage (CC-CV), where the cut-off current was 0.05 C; and then discharged to 2.5 V at a ⅓ C constant current and constant voltage. A discharge curve of voltage vs capacity was plotted, and the median voltage was found.

A method for testing the rate performance is: At 25° C., the whole cell corresponding to each example was first charged to 4.2 V at a 0.2 C constant current, and then discharged to 2.5 V at 0.2 C and 5 C constant currents respectively. The ratio of the discharge capacity at 5 C to the discharge capacity at 0.2 C was calculated. The ratio is used to measure the rate performance of the battery.

A method for testing the amount Mn dissolved in the negative electrode was as follows: At 45° C., the whole cell corresponding to each example was charged to 4.3 V at a 1 C constant current, and then discharged to 2.5 V at a 1 C constant current. After the charge and discharge cycles were carried out for 500 times, the cell was dissembled and the Mn content in the negative electrode material of the negative electrode plate was tested. The content of Mn was measured by an inductively coupled plasma-emission spectrometer (ICP).

In addition, to make the beneficial effects of the technical solutions of the present disclosure prominent, positive electrode materials of comparative examples 1 to 7 were further provided, and the parameters of each LMFP material used in the positive electrode materials are shown in Table 1.

TABLE 1

| Experiment No. | Particle size $D_{50}$ of particle 1/μm | Particle size ratio | Particle quantity ratio | Particle morphology | Particle Mn/Fe ratio |
|---|---|---|---|---|---|
| Example 1 | Particle 1 = 8 | a = 0.41 b = 0.23 c = 0.18 d = 0.16 | 1:1:2:8:8 | Particle 1: Aggregate Particle 2: Aggregate Particle 3: Single crystal-like Particle 4: Single crystal-like Particle 5: Single crystal-like | Particle 1 = 0.55:0.45 = 1.22 Particle 2 = 0.65:0.35 = 1.86 Particle 3 = 0.75:0.25 = 3 Particle 4/5 = 0.85:0.15 = 5.6 |
| Example 2 | Particle 1 = 8 | a = 0.41 b = 0.23 c = 0.18 d = 0.16 | 1:1:2:8:8 | Particle 1: Aggregate Particle 2: Aggregate Particle 3: Single crystal-like Particle 4: Single crystal-like Particle 5: Single crystal-like | Particle 1 = 0.55:0.45 = 1.22 Particle 2 = 0.65:0.35 = 1.86 Particle 3 = 0.75:0.25 = 3 Particle 4/5 = 0.88:0.12 = 7.33 |
| Example 3 | Particle 1 = 8 | a = 0.41 b = 0.23 c = 0.18 d = 0.16 | 1:1:2:8:8 | Particle 1: Aggregate Particle 2: Aggregate Particle 3: Single crystal-like Particle 4: Single crystal-like Particle 5: Single crystal-like | Particle 1 = 0.55:0.45 = 1.22 Particle 2 = 0.68:0.32 = 2.125 Particle 3 = 0.78:0.22 = 3.545 Particle 4/5 = 0.85:0.15 = 5.6 |
| Example 4 | Particle 1 = 8 | a = 0.41 b = 0.23 c = 0.18 d = 0.16 | 1:1:2:8:8 | Particle 1: Aggregate Particle 2: Aggregate Particle 3: Single crystal-like Particle 4: Single crystal-like Particle 5: Single crystal-like | Particle 1 = 0.55:0.45 = 1.22 Particle 2 = 0.63:0.37 = 1.7 Particle 3 = 0.72:0.28 = 2.57 Particle 4/5 = 0.85:0.15 = 5.6 |
| Example 5 | Particle 1 = 4 | a = 0.41 b = 0.23 c = 0.18 d = 0.16 | 1:1:2:8:8 | Particle 1: Aggregate Particle 2: Single crystal-like Particle 3: Single crystal-like Particle 4: Single crystal-like Particle 5: Single crystal-like | Particle 1 = 0.55:0.45 = 1.22 Particle 2 = 0.65:0.35 = 1.86 Particle 3 = 0.75:0.25 = 3 Particle 4/5 = 0.85:0.15 = 5.6 |
| Example 6 | Particle 1 = 12 | a = 0.41 b = 0.23 c = 0.18 d = 0.16 | 1:1:2:8:8 | Particle 1: Aggregate Particle 2: Aggregate Particle 3: Aggregate Particle 4: Single crystal-like Particle 5: Single crystal-like | Particle 1 = 0.55:0.45 = 1.22 Particle 2 = 0.65:0.35 = 1.86 Particle 3 = 0.75:0.25 = 3 Particle 4/5 = 0.85:0.15 = 5.6 |
| Example 7 | Particle 1 = 8 | a = 0.45 b = 0.23 c = 0.18 d = 0.16 | 1:1:2:8:8 | Particle 1: Aggregate Particle 2: Aggregate Particle 3: Single crystal-like Particle 4: Single crystal-like Particle 5: Single crystal-like | Particle 1 = 0.55:0.45 = 1.22 Particle 2 = 0.65:0.35 = 1.86 Particle 3 = 0.75:0.25 = 3 Particle 4/5 = 0.85:0.15 = 5.6 |
| Example 8 | Particle 1 = 8 | a = 0.41 b = 0.21 c = 0.18 d = 0.16 | 1:1:2:8:8 | Particle 1: Aggregate Particle 2: Aggregate Particle 3: Single crystal-like Particle 4: Single crystal-like Particle 5: Single crystal-like | Particle 1 = 0.55:0.45 = 1.22 Particle 2 = 0.65:0.35 = 1.86 Particle 3 = 0.75:0.25 = 3 Particle 4/5 = 0.85:0.15 = 5.6 |

TABLE 1-continued

Parameters of positive electrode materials in examples and comparative examples

| Experiment No. | Particle size $D_{50}$ of particle 1/μm | Particle size ratio | Particle quantity ratio | Particle morphology | Particle Mn/Fe ratio |
|---|---|---|---|---|---|
| Example 9 | Particle 1 = 8 | a = 0.45<br>b = 0.21<br>c = 0.18<br>d = 0.16 | 1:1:2:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Example 10 | Particle 1 = 8 | a = 0.41<br>b = 0.23<br>c = 0.18<br>d = 0.16 | 1.2:1.2:2.4:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Example 11 | Particle 1 = 8 | a = 0.41<br>b = 0.23<br>c = 0.18<br>d = 0.16 | 0.8:0.8:1.6:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Example 12 | Particle 1 = 8 | a = 0.41<br>b = 0.23<br>c = 0.18<br>d = 0.16 | 1:1:2:6.4:9.6 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Example 13 | Particle 1 = 8 | a = 0.45<br>b = 0.21<br>c = 0.18<br>d = 0.16 | 1:1:2:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.50:0.40 = 1<br>Particle 2 = 0.65:0.35 = 1.86<br>Particle 3 = 0.75:0.25 = 3<br>Particle 4/5 = 0.90:0.10 = 9 |
| Comparative Example 1 | Particle 1 = 8 | a = 0.75<br>b = 0.35<br>c = 0.18<br>d = 0.16 | 1:1:2:8:8 | Particle 1: Aggregate<br>Particle 2: Single crystal-like<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Comparative Example 2 | Particle 1 = 8 | a = 0.25<br>b = 0.15<br>c = 0.18<br>d = 0.16 | 1:1:2:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Comparative Example 3 | Particle 1 = 8 | a = 0.41<br>b = 0.23<br>c = 0.18<br>d = 0.16 | 1:2:4:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |

TABLE 1-continued

Parameters of positive electrode materials in examples and comparative examples

| Experiment No. | Particle size $D_{50}$ of particle 1/μm | Particle size ratio | Particle quantity ratio | Particle morphology | Particle Mn/Fe ratio |
|---|---|---|---|---|---|
| Comparative Example 4 | Particle 1 = 8 | a = 0.41<br>b = 0.23<br>c = 0.18<br>d = 0.16 | 1:1:2:12:15 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Comparative Example 5 | Particle 1 = 8 | a = 0.41<br>b = 0.23<br>c = 0.18<br>d = 0.16 | 1:0.5:0.8:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Comparative Example 6 | Particle 1 = 8 | a = 0.41<br>b = 0.23<br>c = 0.18<br>d = 0.16 | 1:1:2:4:3 | Particle 1: Aggregate<br>Particle 2: Aggregate<br>Particle 3: Single crystal-like<br>Particle 4: Single crystal-like<br>Particle 5: Single crystal-like | Particle 1 = 0.55:0.45 = 1.22<br>Particle 2 = 0.65:0.35 = 1.86<br>Particle 3 = 0.75:0.25 = 3<br>Particle 4/5 = 0.85:0.15 = 5.6 |
| Comparative Example 7 | Particle 1 = 8 | a = 0.41<br>b = 0.23<br>c = 0.18<br>d = 0.16 | 1:1:2:8:8 | Particle 1: Aggregate<br>Particle 2: Aggregate<br>Particle 3: Single crystal-like<br>Particle 4: Single crystal-like<br>Particle 5: Single crystal-like | Particle 1 = 0.75:0.25 = 3<br>Particle 2 = 0.85:0.15 = 5.6<br>Particle 3 = 0.55:0.45 = 1.22<br>Particle 4/5 = 0.65:0.35 = 1.86 |

TABLE 2

Performance parameters of positive electrode plates
and batteries in examples and comparative examples

| Experiment No. | Positive electrode plate compaction density/cm³ | Median value Voltage/V | Specific capacity mAh/g | Rate 5 C/0.2 C % | C500-negative electrode manganese content/ppm |
|---|---|---|---|---|---|
| Example 1 | 2.72 | 3.85 | 165 | 90 | 300 |
| Example 2 | 2.71 | 3.86 | 163 | 87 | 320 |
| Example 3 | 2.72 | 3.86 | 164 | 90 | 350 |
| Example 4 | 2.73 | 3.83 | 166 | 89 | 300 |
| Example 5 | 2.65 | 3.84 | 166 | 91 | 500 |
| Example 6 | 2.67 | 3.83 | 164 | 86 | 290 |
| Example 7 | 2.73 | 3.81 | 166 | 87 | 320 |
| Example 8 | 2.72 | 3.82 | 164 | 84 | 350 |
| Example 9 | 2.69 | 3.80 | 161 | 85 | 360 |
| Example 10 | 2.85 | 3.83 | 166 | 90 | 390 |
| Example 11 | 2.81 | 3.79 | 164 | 87 | 370 |
| Example 12 | 2.86 | 3.81 | 165 | 89 | 360 |
| Example 13 | 2.83 | 3.79 | 163 | 89 | 350 |
| Comparative Example 1 | 2.41 | 3.81 | 162 | 85 | 580 |
| Comparative Example 2 | 2.26 | 3.85 | 163 | 85 | 350 |
| Comparative Example 3 | 2.45 | 3.83 | 165 | 90 | 390 |
| Comparative Example 4 | 2.05 | 3.79 | 161 | 81 | 350 |
| Comparative Example 5 | 2.15 | 3.83 | 162 | 83 | 380 |
| Comparative Example 6 | 2.48 | 3.78 | 164 | 88 | 390 |

TABLE 2-continued

| | Performance parameters of positive electrode plates and batteries in examples and comparative examples | | | | |
|---|---|---|---|---|---|
| Experiment No. | Positive electrode plate compaction density/cm$^3$ | Median value Voltage/V | Specific capacity mAh/g | Rate 5 C/0.2 C % | C500-negative electrode manganese content/ppm |
| Comparative Example 7 | 2.71 | 3.84 | 165 | 85 | 900 |

As can be seen from Tables 1 and 2, when the positive electrode materials in Examples 1 to 13 satisfy the requirements on the particle morphology, the particle size relationship and Mn/Fe ratio relationship in the present disclosure, the compaction density of the positive electrode plate can be 2.65 g/cm$^3$ or more, and can reach up to 2.86 g/cm$^3$, and the specific capacity of the battery is not significantly reduced, enabling the battery to have a high energy density. In addition, the positive electrode materials of the above examples also enable the battery to have a high median voltage, good rate performance and excellent cycle performance at the same time. For example, the battery manufactured with the positive electrode material of each example has good rate performance, and the ratio of the discharge capacity at 5 C to the discharge capacity 0.2 C is 84% or more, and can reach 91%, which also indicates that the battery has good continuous power performance. After 500 cycles at 45° C., the dissolved Mn amount of the negative electrode was lower than 500 ppm.

In addition, it can be seen from the comparison between Comparative Examples 1 and 2 and Example 1 that if the ratios a, b, c, and d of the particle sizes $D_{50}$ between the second LMFP material to the fifth LMFP material and the first LMFP material are not within the range defined above, the compaction density of the electrode plate manufactured with the materials is greatly reduced. It can be seen from the comparison between Comparative Examples 3 to 5 and Example 1 that if the particle number ratio of the five LMFP materials is not within the range defined above, the compaction density of the electrode plate is significantly reduced. It can be seen from the comparison between Comparative Example 7 and Example 1 that if the Mn/Fe molar ratios in the first LMFP material to the fifth LMFP material do not satisfy the value relationship defined in the present disclosure, the rate performance of the battery is significantly reduced and the amount of Mn dissolved in the negative electrode is greatly increased.

The above-described embodiments are merely illustrative of several implementations of the present disclosure, and the description is specific and particular, but does not limit the scope of the present disclosure. It should be pointed out that for those of ordinary skill in the art, several variations and improvements can be made without departing from the concept of the present disclosure, which are all regarded as falling within the protection scope of the present disclosure. Therefore, the protection scope of the present disclosure is defined by the appended claims.

What is claimed is:
1. A positive electrode material, comprising: a first lithium manganese iron phosphate material, a second lithium manganese iron phosphate material, a third lithium manganese iron phosphate material, a fourth lithium manganese iron phosphate material and a fifth lithium manganese iron phosphate material, wherein, the first lithium manganese iron phosphate material is an aggregate, the fourth lithium manganese iron phosphate material and the fifth lithium manganese iron phosphate material are single-crystal-like, the second lithium manganese iron phosphate material and the third lithium manganese iron phosphate material are aggregates and/or single-crystal-like, and particle size relationships thereof satisfy:

$D_{50}^5 < D_{50}^4 < D_{50}^3 < D_{50}^2 < D_{50}^1$, $D_{50}^2 = aD_{50}^1$, $D_{50}^3 = bD_{50}^1$, $D_{50}^4 = cD_{50}^1$, $D_{50}^5 = dD_{50}^1$, and 5 $\mu m \le D_{50}^1 \le 15$ $\mu m$, wherein, $D_{50}^1$ to $D_{50}^5$ represent particle sizes $D_{50}$ of the first lithium manganese iron phosphate material to the fifth lithium manganese iron phosphate material, a is in a range of 0.35 to 0.5 inclusive, b is in a range of 0.2 to 0.27 inclusive, c is in a range of 0.17 to 0.18 inclusive, and d is in a range of 0.15 to 0.16 inclusive; and molar ratios of manganese to iron in the first lithium manganese iron phosphate material, the second lithium manganese iron phosphate material, the third lithium manganese iron phosphate material, and the fourth lithium manganese iron phosphate material increase sequentially, and a molar ratio of manganese to iron in the fifth lithium manganese iron phosphate material is greater than that in the third lithium manganese iron phosphate material.

2. The positive electrode material according to claim 1, wherein the molar ratio of manganese to iron in the first lithium manganese iron phosphate material is in a range of 1 to 1.25 inclusive, the molar ratio of manganese to iron in the second lithium manganese iron phosphate material is in a range of 1.5 to 2.33 inclusive, the molar ratio of manganese to iron in the third lithium manganese iron phosphate material is in a range of 2.33 to 4 inclusive, and the molar ratios of manganese to iron in the fourth lithium manganese iron phosphate material and the fifth lithium manganese iron phosphate material are in a range of 4 to 9 inclusive.

3. The positive electrode material according to claim 1, wherein a is in a range of 0.41 to 0.45 inclusive; and b is in a range of 0.21 to 0.23 inclusive.

4. The positive electrode material according to claim 1, wherein a is 0.41, b is 0.23, c is 0.18, and d is 0.16.

5. The positive electrode material according to claim 1, wherein a particle quantity ratio between the first lithium manganese iron phosphate material, the second lithium manganese iron phosphate material, the third lithium manganese iron phosphate material, the fourth lithium manganese iron phosphate material, and the fifth lithium manganese iron phosphate material is (0.8-1.2):(0.8-1.2):(1.6-2.4):(6.4-9.6):(6.4-9.6).

6. The positive electrode material according to claim 1, wherein a particle quantity ratio between the first lithium manganese iron phosphate material, the second lithium manganese iron phosphate material, the third lithium manganese iron phosphate material, the fourth lithium manganese iron phosphate material, and the fifth lithium manganese iron phosphate material is 1:1:2:8:8.

7. The positive electrode material according to claim 1, wherein a median particle size of primary particles of the aggregate is in a range of 100 nm to 500 nm inclusive.

8. A positive electrode plate, comprising a current collector and a positive electrode material layer disposed on the current collector, wherein the positive electrode material layer comprises a positive electrode material, and the positive electrode material comprises:

a first lithium manganese iron phosphate material, a second lithium manganese iron phosphate material, a third lithium manganese iron phosphate material, a fourth lithium manganese iron phosphate material and a fifth lithium manganese iron phosphate material, the first lithium manganese iron phosphate material is an aggregate, the fourth lithium manganese iron phosphate material and the fifth lithium manganese iron phosphate material are single-crystal-like, the second lithium manganese iron phosphate material and the third lithium manganese iron phosphate material are aggregates and/or single-crystal-like, and particle size relationships thereof satisfy:

$D_{50}^5 < D_{50}^4 < D_{50}^3 < D_{50}^2 < D_{50}^1$, $D_{50}^2 = aD_{50}^1$, $D_{50}^3 = bD_{50}^1$, $D_{50}^4 = cD_{50}^1$, $D_{50}^5 = dD_{50}^1$, and 5 $\mu m \leq D_{50}^1 \leq 15 \mu m$, wherein $D_{50}^1$ to $D_{50}^5$ represent particle sizes $D_{50}$ of the first lithium manganese iron phosphate material to the fifth lithium manganese iron phosphate material, a is in a range of 0.35 to 0.5 inclusive, b is in a range of 0.2 to 0.27 inclusive, c is in a range of 0.17 to 0.18 inclusive, and d is in a range of 0.15 to 0.16 inclusive; and molar ratios of manganese to iron in the first lithium manganese iron phosphate material, the second lithium manganese iron phosphate material, the third lithium manganese iron phosphate material, and the fourth lithium manganese iron phosphate material increase sequentially, and a molar ratio of manganese to iron in the fifth lithium manganese iron phosphate material is greater than that in the third lithium manganese iron phosphate material.

9. The positive electrode plate according to claim 8, wherein the molar ratio of manganese to iron in the first lithium manganese iron phosphate material is in a range of 1 to 1.25 inclusive, the molar ratio of manganese to iron in the second lithium manganese iron phosphate material is in a range of 1.5 to 2.33 inclusive, the molar ratio of manganese to iron in the third lithium manganese iron phosphate material is in a range of 2.33 to 4 inclusive, and the molar ratios of manganese to iron in the fourth lithium manganese iron phosphate material and the fifth lithium manganese iron phosphate material are in a range of 4 to 9 inclusive.

10. The positive electrode plate according to claim 8, wherein a is in a range of 0.41 to 0.45 inclusive; and b is in a range of 0.21 to 0.23 inclusive.

11. The positive electrode plate according to claim 8, wherein a is 0.41, b is 0.23, c is 0.18, and d is 0.16.

12. The positive electrode plate according to claim 8, wherein a particle quantity ratio between the first lithium manganese iron phosphate material, the second lithium manganese iron phosphate material, the third lithium manganese iron phosphate material, the fourth lithium manganese iron phosphate material, and the fifth lithium manganese iron phosphate material is (0.8-1.2):(0.8-1.2):(1.6-2.4):(6.4-9.6):(6.4-9.6).

13. The positive electrode plate according to claim 8, wherein a particle quantity ratio between the first lithium manganese iron phosphate material, the second lithium manganese iron phosphate material, the third lithium manganese iron phosphate material, the fourth lithium manganese iron phosphate material, and the fifth lithium manganese iron phosphate material is 1:1:2:8:8.

14. The positive electrode plate according to claim 8, wherein a median particle size of primary particles of the aggregate is in a range of 100 nm to 500 nm inclusive.

15. A battery, comprising a positive electrode plate comprising a current collector and a positive electrode material layer disposed on the current collector, wherein the positive electrode material layer comprises a positive electrode material, and the positive electrode material comprises:

a first lithium manganese iron phosphate material, a second lithium manganese iron phosphate material, a third lithium manganese iron phosphate material, a fourth lithium manganese iron phosphate material and a fifth lithium manganese iron phosphate material, the first lithium manganese iron phosphate material is an aggregate, the fourth lithium manganese iron phosphate material and the fifth lithium manganese iron phosphate material are single-crystal-like, the second lithium manganese iron phosphate material and the third lithium manganese iron phosphate material are aggregates and/or single-crystal-like, and particle size relationships thereof satisfy:

$D_{50}^5 < D_{50}^4 < D_{50}^3 < D_{50}^2 < D_{50}^1$, $D_{50}^2 = aD_{50}^1$, $D_{50}^3 = bD_{50}^1$, $D_{50}^4 = cD_{50}^1$, $D_{50}^5 = dD_{50}^1$, and 5 $\mu m \leq D_{50}^1 \leq 15 \mu m$, wherein $D_{50}^1$ to $D_{50}^5$ represent particle sizes $D_{50}$ of the first lithium manganese iron phosphate material to the fifth lithium manganese iron phosphate material, a is in a range of 0.35 to 0.5 inclusive, b is in a range of 0.2 to 0.27 inclusive, c is in a range of 0.17 to 0.18 inclusive, and d is in a range of 0.15 to 0.16 inclusive; and molar ratios of manganese to iron in the first lithium manganese iron phosphate material, the second lithium manganese iron phosphate material, the third lithium manganese iron phosphate material, and the fourth lithium manganese iron phosphate material increase sequentially, and a molar ratio of manganese to iron in the fifth lithium manganese iron phosphate material is greater than that in the third lithium manganese iron phosphate material.

16. The battery according to claim 15, wherein the molar ratio of manganese to iron in the first lithium manganese iron phosphate material is in a range of 1 to 1.25 inclusive, the molar ratio of manganese to iron in the second lithium manganese iron phosphate material is in a range of 1.5 to 2.33 inclusive, the molar ratio of manganese to iron in the third lithium manganese iron phosphate material is in a range of 2.33 to 4 inclusive, and the molar ratios of manganese to iron in the fourth lithium manganese iron phosphate material and the fifth lithium manganese iron phosphate material are in a range of 4 to 9 inclusive.

17. The battery according to claim 15, wherein a is in a range of 0.41 to 0.45 inclusive; and b is in a range of 0.21 to 0.23 inclusive.

18. The battery according to claim 15, wherein a is 0.41, b is 0.23, c is 0.18, and d is 0.16.

19. The battery according to claim 15, wherein a particle quantity ratio between the first lithium manganese iron phosphate material, the second lithium manganese iron phosphate material, the third lithium manganese iron phosphate material, the fourth lithium manganese iron phosphate material, and the fifth lithium manganese iron phosphate material is (0.8-1.2):(0.8-1.2):(1.6-2.4):(6.4-9.6):(6.4-9.6).

20. The battery according to claim 15, wherein a particle quantity ratio between the first lithium manganese iron phosphate material, the second lithium manganese iron phosphate material, the third lithium manganese iron phosphate material, the fourth lithium manganese iron phosphate material, and the fifth lithium manganese iron phosphate material is 1:1:2:8:8.

* * * * *